US010361762B2

(12) United States Patent
Grybos et al.

(10) Patent No.: US 10,361,762 B2
(45) Date of Patent: Jul. 23, 2019

(54) CALIBRATION OF SATELLITE BEAMFORMING CHANNELS

(71) Applicant: Space Systems/Loral, LLC, Palo Alto, CA (US)

(72) Inventors: David Grybos, San Jose, CA (US); James Knecht, San Jose, CA (US); Farid Elwailly, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 8 days.

(21) Appl. No.: 15/833,351

(22) Filed: Dec. 6, 2017

(65) Prior Publication Data

US 2019/0173545 A1    Jun. 6, 2019

(51) Int. Cl.
    *H04B 7/15*     (2006.01)
    *H04B 7/06*     (2006.01)
    *H04B 1/69*     (2011.01)
    *H04B 7/185*    (2006.01)

(52) U.S. Cl.
    CPC ............ *H04B 7/0617* (2013.01); *H04B 1/69* (2013.01); *H04B 7/185* (2013.01)

(58) Field of Classification Search
    CPC ........ H04B 7/0617; H04B 1/69; H04B 7/185; H04B 17/21; H04B 7/18513; H04B 7/2041; H04B 17/11; H04B 7/155; H03F 3/68; H03F 2200/192
    See application file for complete search history.

(56) References Cited

U.S. PATENT DOCUMENTS

| 4,907,004 | A | 3/1990 | Zacharatos et al. |
| 5,530,449 | A | 6/1996 | Wachs et al. |
| 5,543,801 | A | 8/1996 | Shawyer |
| 5,886,573 | A | 3/1999 | Kolanek |

(Continued)

FOREIGN PATENT DOCUMENTS

| CN | 102394679 B | 7/2014 |
| EP | 0812027 B1 | 5/2005 |
| EP | 1532716 B1 | 5/2005 |

OTHER PUBLICATIONS

English translation of CN Publication No. 102394679B, published on Jul. 2, 2014, Google Patents translation downloaded May 4, 2017.

(Continued)

*Primary Examiner* — Wutchung Chu
(74) *Attorney, Agent, or Firm* — Vierra Magen Marcus LLP

(57) ABSTRACT

Beamforming channels of a satellite are calibrated using a low power, spread spectrum calibration signal. The power of the calibration signal is below the noise level of a user signal in an active channel, allowing channels to be calibrated while active. When calibrating the transmit side circuitry, a two-stage calibration can be used, first calibrating the output hybrid matrix, then calibrating the whole of the transmit side. To improve performance, the dwell time spend calibrating a channel can be based on the power of the user signal in the channel. A transmit probe can be used to inject a calibration signal into the receive antennae and a receive probe can be used to extract the calibration signal from the transmit antennae. To reduce frequency of calibrations, the calibrations can be based on path-to-path differences.

20 Claims, 12 Drawing Sheets

(56) References Cited

U.S. PATENT DOCUMENTS

| | | | |
|---|---|---|---|
| 6,668,161 B2 | 12/2003 | Boros et al. | |
| 7,688,692 B2 | 3/2010 | Chen | |
| 7,787,819 B2 | 8/2010 | Walker et al. | |
| 7,822,147 B2 | 10/2010 | Huang et al. | |
| 8,184,678 B2 | 5/2012 | McHenry | |
| 9,014,619 B2* | 4/2015 | Benjamin | H04B 7/2041 330/124 R |
| 9,735,742 B2 | 8/2017 | Roukos et al. | |
| 2004/0046695 A1* | 3/2004 | Brothers, Jr. | G01S 3/32 342/427 |
| 2004/0061644 A1 | 4/2004 | Lier et al. | |
| 2005/0272392 A1 | 12/2005 | Richardson | |
| 2008/0051080 A1* | 2/2008 | Walker | H04B 7/2041 455/427 |
| 2008/0153433 A1 | 6/2008 | Pallonen et al. | |
| 2009/0298422 A1 | 12/2009 | Conroy et al. | |
| 2010/0090762 A1* | 4/2010 | van Zelm | H03F 1/3247 330/84 |
| 2010/0164782 A1* | 7/2010 | Saha | H04B 7/18515 342/174 |
| 2010/0177678 A1* | 7/2010 | Sayegh | H04B 7/18513 370/315 |
| 2014/0354355 A1 | 12/2014 | Moreau | |
| 2014/0362896 A1 | 12/2014 | Aymes et al. | |
| 2017/0093539 A1* | 3/2017 | Wang | H04B 17/12 |
| 2018/0019806 A1* | 1/2018 | Buer | H04B 7/18534 |
| 2018/0227043 A1* | 8/2018 | Dankberg | H04B 7/18515 |
| 2019/0007129 A1* | 1/2019 | Vargas | H04B 17/382 |

OTHER PUBLICATIONS

English Abstract of EP Publication No. 1532716, published on May 25, 2005.
Notice of Allowance dated Jan. 17, 2019, U.S. Appl. No. 15/926,628, filed Mar. 20, 2018.
Notice of Allowance dated Jan. 28, 2019, U.S. Appl. No. 15/926,186, filed Mar. 20, 2018.
U.S. Appl. No. 15/926,628, filed Mar. 20, 2018 by Elwailly et al.
U.S. Appl. No. 15/926,186, filed Mar. 20, 2018 by Elwailly et al.
U.S. Appl. No. 16/405,162 filed May 7, 2019,

* cited by examiner

CALIBRATION OF SATELLITE BEAMFORMING CHANNELS

BACKGROUND

In order to properly transmit signals to subscribers, a communication satellite needs to be accurately calibrated. Although a satellite may be initially well-calibrated, over time, and particularly in the harsh conditions of space, the calibration can drift, requiring recalibration. Beamforming satellites transmit a signal from several antennae that form a beam at chosen locations though constructive and destructive interference between the different signals. Beamforming satellites must be calibrated to a set of requirements that are tighter that those for a non-beamforming satellite as the gain, phase and delay must be accurately calibrated so that the different transmitted signals constructively interfere properly at the desired location.

DETAILED DESCRIPTION

The following presents techniques allowing channels of a satellite to be calibrated while the channels are in active operation. A spread spectrum calibration signal is generated and injected into a channel of the satellite. The spread spectrum signal has a power level below the thermal noise floor of a customer or user signal active in the channel, allowing the calibration to be performed without disruption in service. After passing through a section of the channel, such as the receive or transmit portion, the calibration signal is de-spread and used to determine adjustments to calibrate the channel. Although the following is described primarily in the context of a beamforming system, due the usually more stringent calibration requirements of such system, the techniques can also be applied more generally to non-beamforming satellites and systems.

To further improve the calibration process, when the transmit side of the satellite includes an output hybrid matrix, the calibration of the transmit side can be performed in two steps. In a first step, the spread spectrum calibration signal is injected into the path at the input of an output hybrid matrix and used to calibrate this portion of the path. A second calibration step is then performed to correct for the whole of the channel's transmit path.

The efficiency of the calibration process can be improved by accounting for the power of the user signal in a channel. The lower the power of a channel's signal, the lower the signal to noise ratio for that channel, so that the lower the power of the user's signal in the channel, the less time spent calibrating the channel. Consequently, rather than use a calibration time based on the worst case (i.e., highest) power that may be in an active channel, the calibration time in each can be based on the power level of the user signal in the channel.

To reduce circuit complexity and weight, rather than having the switching and multiplexing circuitry to inject and extract the spread spectrum calibration signal individually for each channel, a receive antenna probe can concurrently inject the calibration into multiple channels and a transmit antenna probe can concurrently extract the calibration signal from multiple channels.

To reduce the frequency with which such calibrations need to be performed, the signal paths can be calibrated based on relative path to path differences, rather than calibrating relative to some absolute base line. As beamforming requires that the different signals for the satellite have the proper amplitude, phase and delay relative to one another, if all of the signals have a common amount of drift for signals, they will still form a beam. Consequently, by using a path to path calibration, the channels will not need to be calibrated for common shifts in phase and other parameters.

Figure 1:
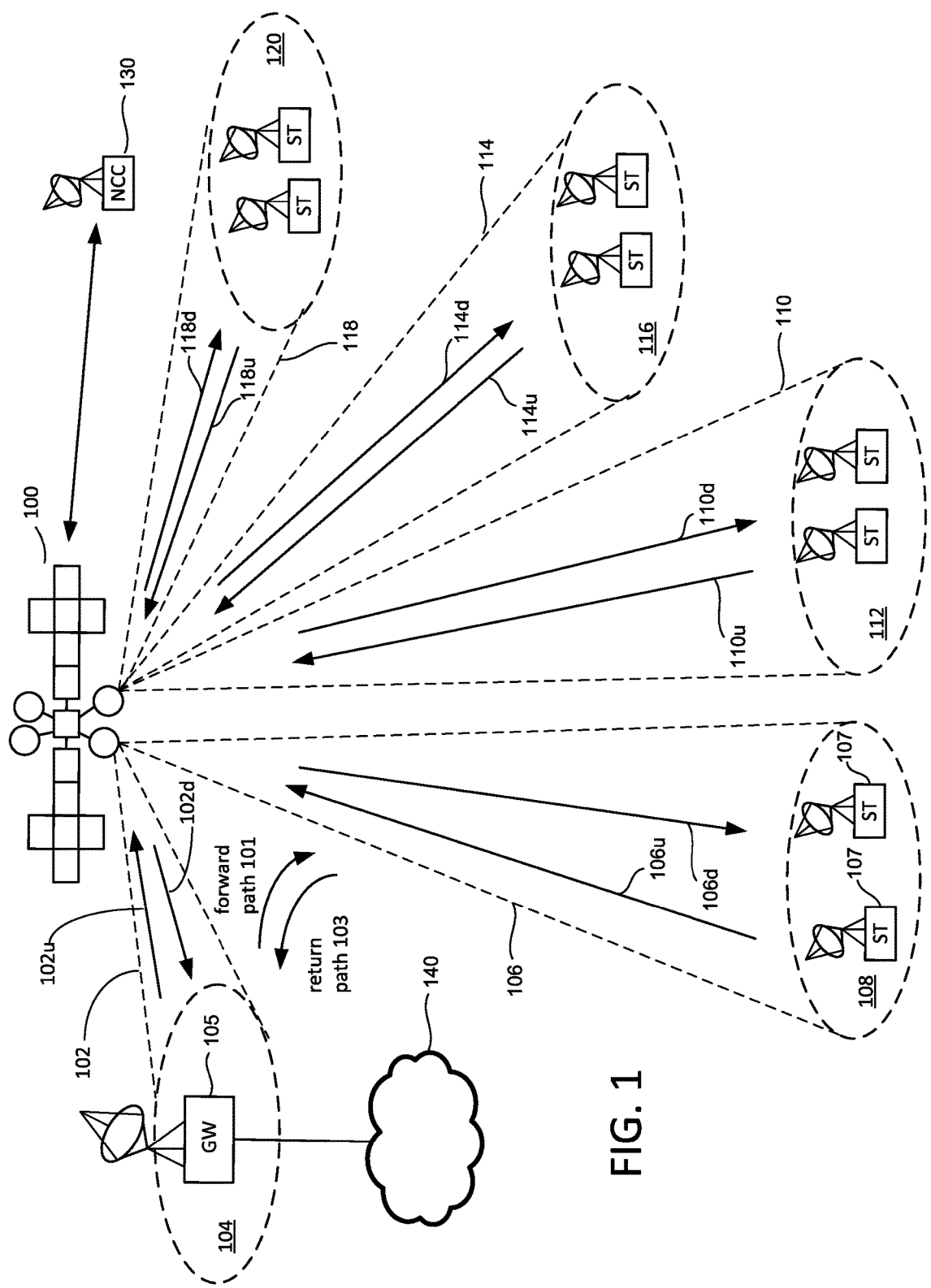
FIG. 1 is a block diagram describing a satellite communication system.

FIG. 1 illustrate one embodiments in which these calibration methods can be applied and depicts a block diagram of a wireless communications system that includes a communication platform 100, which may be a satellite located, for example, at a geostationary or non-geostationary orbital location. In other embodiments, other platforms may be used such as UAV or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway 105 and a plurality of subscriber terminals ST (including subscriber terminals 107). The term subscriber terminals may be used to refer to a single subscriber terminal or multiple subscriber terminals. A subscriber terminal is adapted for communication with the wireless communication platform including as satellite 100. Subscriber terminals may include fixed and mobile subscriber terminals including, but not limited to, a cellular telephone, wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile.

In one embodiment, satellite 100 comprises a bus (i.e. spacecraft) and one or more payloads (i.e. the communication payload). The satellite may also include multiple power sources, such as batteries, solar panels, and one or more propulsion systems, for operating the bus and the payload.

At least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. Note that the terms "feeder" beams and "service" beams are used for convenience. Both feeder beams and service beams are spot beams and the terms are not used in a manner to limit the function of any beam. In one embodiment, a gateway is located in the same spot beam as sub scriber terminals.

Subscriber terminals ST and satellite 100 communicate over service beams; for example, FIG. 1 shows service beams 106, 110, 114 and 118 for illuminating regions 108, 112, 116 and 120, respectively. In many embodiments, the communication system will include more than four service beams (e.g., 60, 100, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. Although the above example mentions service beam 106, the example could have used other service beams.

Data can also be sent from the subscriber terminals ST over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. Although the above example uses service beam 106, the example could have used any service beam.

FIG. 1 also shows a Network Control Center 130, which includes an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

In one embodiment, communication platform 100 implements the technology described above. In other embodiments, the technology described above is implemented on a different platform (e.g. on the ground or on a different type of satellite) in a different communication system.

The architecture of FIG. 1 is provided by way of example and not limitation. Embodiments of the disclosed technology may be practiced using numerous alternative implementations.

Figure 2A:
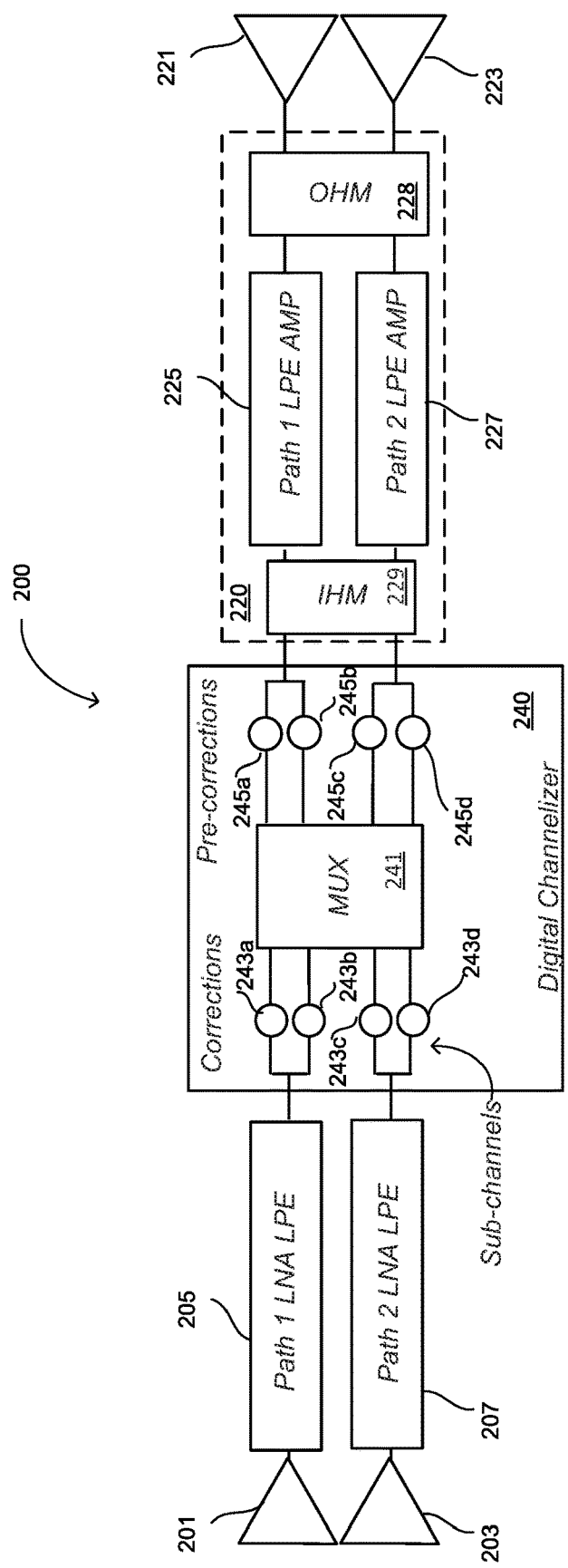
FIG. 2A is a block diagram of a satellite or other beamforming apparatus for an example of two input ports and two output ports.

FIG. 2A is a block diagram of a satellite or other beam-forming apparatus for a simplified example of two input ports and two output ports, illustrating some of the elements that an embodiment of satellite 100 of FIG. 1 may include. Although FIG. 2 shows only two input ports and paths, and two output ports and paths for purposes of discussion, a real implementation of a satellite 100 as in FIG. 1 may have tens or even hundreds of such inputs, outputs and channels.

In this example, the receive side of the satellite 200 includes two antennae or other input ports 201, 203 each connected to a corresponding input path 205, 207. The input paths include low noise amplifiers (LNAs) and other low power equipment (LPE), such as mixers, amplifiers and filters used to process the received signals, which are then separated out into sub-channels, where the example shows two sub-channels per channel. These elements can introduce relatively large phase, delay and gain variations, such as can be caused by temperature variations. In a satellite application, when power consumption is a major consideration, use of low power elements is important, but in other applications where such constraints are less important, higher power components can be used. To account for gain, phase and other variations in each of the sub-channels on the receive side, a set of calibration correction elements 243a-d are included in the sub-channel receive paths. These can be adjusted to calibrate the individual sub-channels, such as would be done during an initial calibration process for the receive side.

On the transmit side, the two antennae or other output ports 221 and 223 are supplied signals from the output block 220. Output block 220 includes transmit path 1 circuitry 225 and transmit path 2 circuitry 227, which each include mixers, filters and amplifiers, including the high-powered amplifiers at the end, to generate the signals for the output ports 221 and 223. The transmit path 1 circuitry 225 and transmit path 2 circuitry 227 is connected to the output ports 221 and 223 through output hybrid matrix OHM 228 on the one side and to the input hybrid matrix IHM 229 on the input side. The input hybrid matrix IHM 229 allows for a signal from any one of the sub-channels to be distributed across multiple transmit paths, and the output hybrid matrix OHM 228 allows signals from any of the transmit paths to be directed to any of the output ports. Rather having all transmit paths be able to handle the maximum amplification power that may be needed in a single channel, the use of the input hybrid matrix IHM 229 and the input hybrid matrix IHM 229 allows for the signal of a sub-channel to be distributed across multiple transmit paths so that unused amplification power in underutilized channels is used to supply extra power for sub-channels needing higher degrees of amplification. This division of amplification allows for the individual transmit paths to use amplifiers of lower power, and consequently less cost and lower weight, which is an important concern in a satellite. A set of calibration pre-correction elements 245*a-d* are included in the sub-channel paths are included to account for gain, phase and other variations in each of the transmit sub-channels on the transmit side. These can be adjusted to calibrate the individual transmit sub-channels, such as would be done during an initial calibration process for the receive side.

A digital channelizer section 240 connects the receive side and the transmit side. In addition to the correction elements 243*a-d* for the receive sub-channels and the pre-correction elements 245*a-d* for the transmit sub-channels, multiplexing circuitry MUX 241 selectively connects the receive sub-channels and the transmit sub-channels.

Figure 2B:
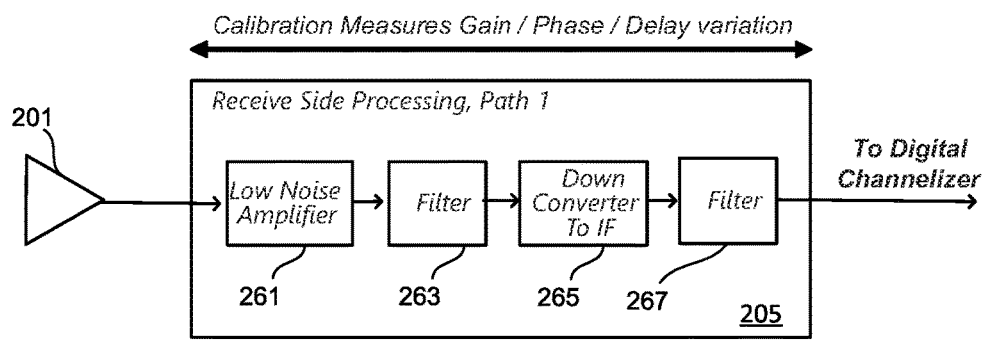
FIGS. 2B and 2C provide more detail on the receive paths and transmit paths of FIG. 2A.
Figure 2C:
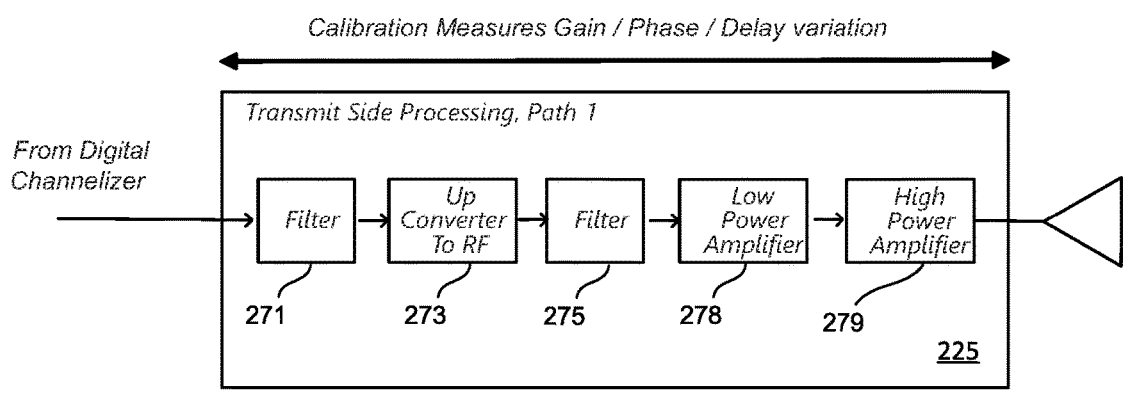

FIGS. 2B and 2C provide more detail on the receive paths and transmit paths of FIG. 2A. FIG. 2B is block diagram illustrating an embodiment of a receive path block, such as 205 or 207 in FIG. 2A, in more detail. More specifically, FIG. 2B provides more detail on some of the elements of one embodiment of receive path 1 205, where other receive paths would have a similar structure. The signal from the input port, such as an antenna 201, is initially received at a low noise amplifier 261. The amplified input signal is then filtered at block 263, down-converted from the received RF range to an intermediate frequency at block at block 265, before being filtered again at block 267. The signal is then sent on to the digital processing elements of the channelizer section 240 and separated out into sub-channels. The calibration process will allow the gain, phase and delay variations across the receive path to be determined.

FIG. 2C provides more detail on some of the elements of one embodiment of the transmit path 1 225 as connected between the input hybrid matrix JIM 229 and the output hybrid matrix 228, where other transmit paths would have a similar structure. The signal from the input hybrid matrix IHM 229 is filtered at block 271 and then up-converted from the IF range to the RF range in block 273, before being filtered again at block 275. The filtered and up-converted signals are then amplified initially by a low power amplifier 278 and then a high-power amplifier 279, before going on to the output hybrid matrix OHM 228. The input hybrid matrix IHM 229 and output hybrid matrix OHM 228 allow for different signals to be distributed across multiple high-power amplifiers from different paths to provide higher amounts of power for a signal than available from a single path, but without the need to have each path to be able to the worst case maximum amplification all by itself.

As noted above, the satellite 200 includes a set of calibration correction elements 243*a-d* in the sub-channel receive paths and calibration pre-correction elements 245*a-d* for the sub-channel transmit paths. These can be used for an initial calibration process prior to the satellite being put into service. However, once the satellite is in service, a channel's calibration traditionally cannot be updated while in use without disruption of any active user signals. Freeing up paths or sub-channels to allow measurement of gain, phase, delay or other values for calibration is not practical during active operation of the satellite payload. The following describes the use of spread spectrum calibration waveforms with power levels below the noise floor of the active signals, allowing calibration to be performed during active operation of the payload.

Although more generally applicable, the techniques described here are particularly useful for beamforming satellites, since in order to form a beam these are calibrated to a set of requirements that are tighter that those for a non-beamforming satellite. Having methods that measure gain, phase, and delay stability in an effective manner combine to reduce complexity and cost, allowing the payload hardware specification of gain, phase and delay stability to be more relaxed. The embodiments primarily described below allow the receive paths and the transmit paths to be individually calibrated. They also allow the simultaneous calibration of the transmit paths before and after an output hybrid matrix and can be done in a time effective manner for satellites with many channels.

Making periodic calibrations during the active operation of channels can help allow the payload hardware specification of gain, phase and delay stability to be more relaxed (for example, relaxing the gain variation specification from 0.2 dB to 10 dB for path to path differences), which can lead to saving in cost. Embodiments described here use a spread spectrum calibration signal generated from a pseudo-random noise sequence that can reside, for example, in a 1 MHz sub channel and set to a power level below the thermal noise floor (such as 17 dB below) at the input to the receive antenna elements to calibrate the receive path or at the input to the transmit paths to calibrate the transmit path. The pseudo random code known by the source and the receiver and used to recover the calibration signal information from an active channel signal. The calibration signal is a DC signal and the pseudo random code's spectrum (bandwidth) is wider than the calibration signal's Information bandwidth. The calibration signal can be injected into the signal path any time a measurement is desired, without interference to user signals. After passing through a particular receive or transmit path, the signal is de-spread, raising it above the other signal energy in the sub channel, where it is detected and measurements can be made to determine adjustments to be used in the calibration.

Figure 3:
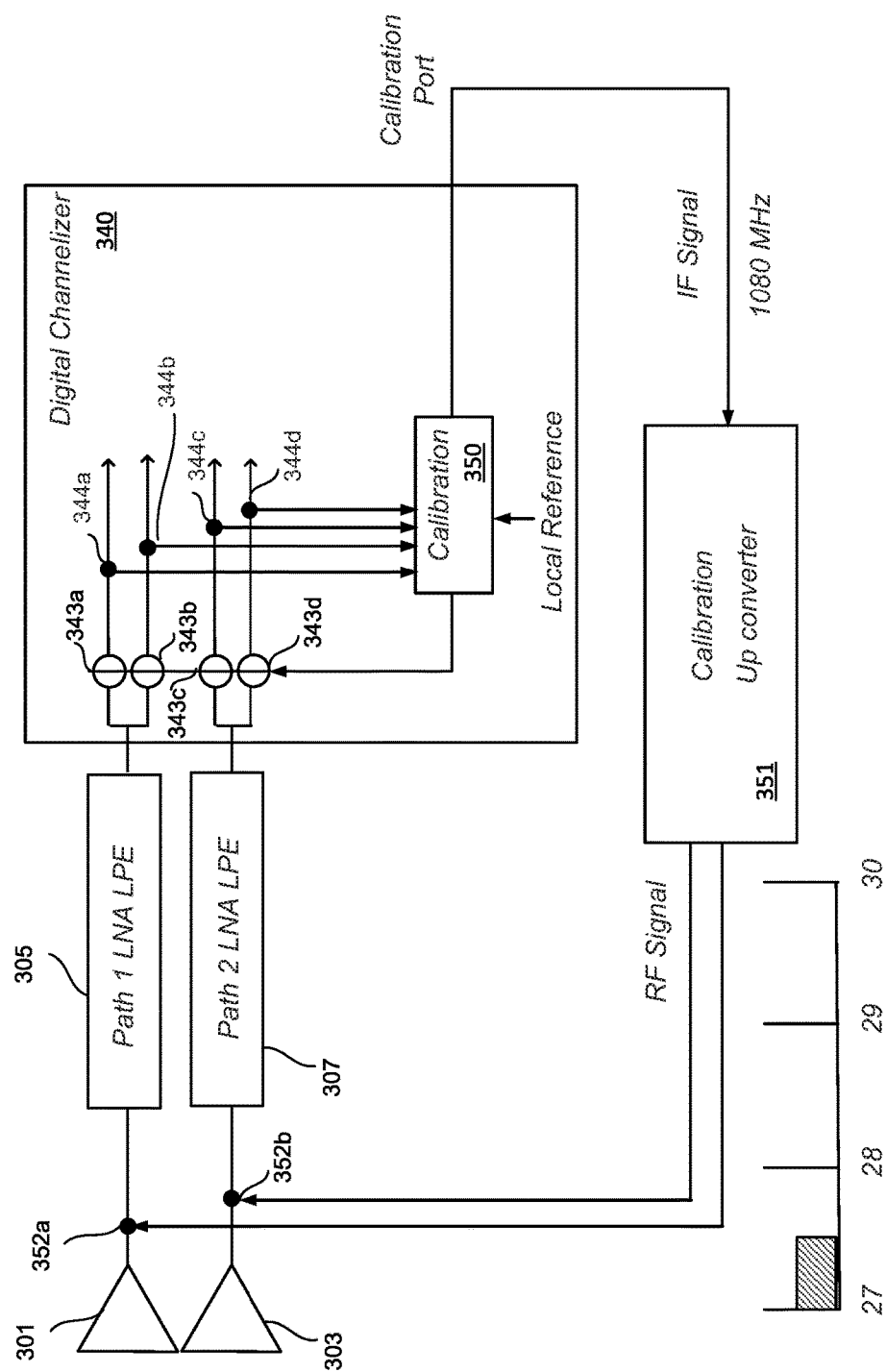
FIG. 3 illustrates an embodiment of the receive side circuitry incorporating the spread spectrum calibration elements.

FIG. 3 illustrates an embodiment of the receive side circuitry incorporating the spread spectrum calibration elements, repeating the receive side elements of FIG. 2 and adding calibration elements. More specifically, the receive side of the satellite includes two antennae or other input ports 301, 303 each connected to a corresponding input path 305, 307. A set of calibration correction elements 343*a-d* are included in the sub-channel receive paths.

A calibration block 350 is connected to receive a local reference signal, from which it generates a calibration signal. In this embodiment, the calibration signal is a low power spread spectrum signal formed from pseudo-random noise at an intermediate frequency of 1080 MHz. A calibration up-converter block 351 up-coverts the calibration signal up to the RF range of, in this example, 27-30 GHz. The up-converter block 351 can also include filters and amplifiers to increase the gain, according to the embodiment. A calibration injection ports 352*a* and 352*b* allow the calibration signal to be selectively injected at the start of path 1 305 and path 2 307, respectively. Multiplying the received signal (combination of the active channel plus the calibration signal) by a local version of the pseudo random code reduces the calibration signal bandwidth (which is the pseudo random code bandwidth, i.e. a wideband signal) to the calibration signal's information bandwidth (narrowband). Multiplying the received signal (combination of the active channel plus the calibration signal) by a local version of the pseudo random code increases the active channel bandwidth by the calibration signal's bandwidth. After propagating though a selected path and sub-channel, the injected calibration signal is extracted at extraction ports 344*a-d* and received back at the calibration block, where it can be de-spread and compared with the original signal. Based on the comparison, update corrections can be determined and supplied to the calibration correction elements 343*a-d*. Depending on the embodiment, based on the comparison the corrections can be determined on the satellite, on the ground, or some combination of these. In FIG. 3, the calibration can be between sub channels in the channelizer 340. This is because calibration will not only measure variation between paths, but also variation between sub channels. In effect this is measuring variation across frequency and will be used for equalization across frequency when needed.

Using integration, the pseudo random code spread active channel signal can separated from the calibration signal's information. The embodiments presented here use coding to recover the calibration signal from the active channel signal, rather than using frequency filtering to isolate the calibration signal from the active channel signal. Both the calibration block 350 and up-converter 351 can be implemented as various combinations of one or more of hardware, software and firmware, depending on the embodiment. In the illustrated embodiment, the same calibration block is used for both receive side calibration and transmit side calibration (FIG. 6, below), but in other embodiments the transmit side can have separate calibration elements from the receive side. Additionally, although shown as part of the digital channelizer block 340 in the shown embodiments, more generally part or all of the calibration block elements can be incorporated into other parts of the satellite.

Figure 4:
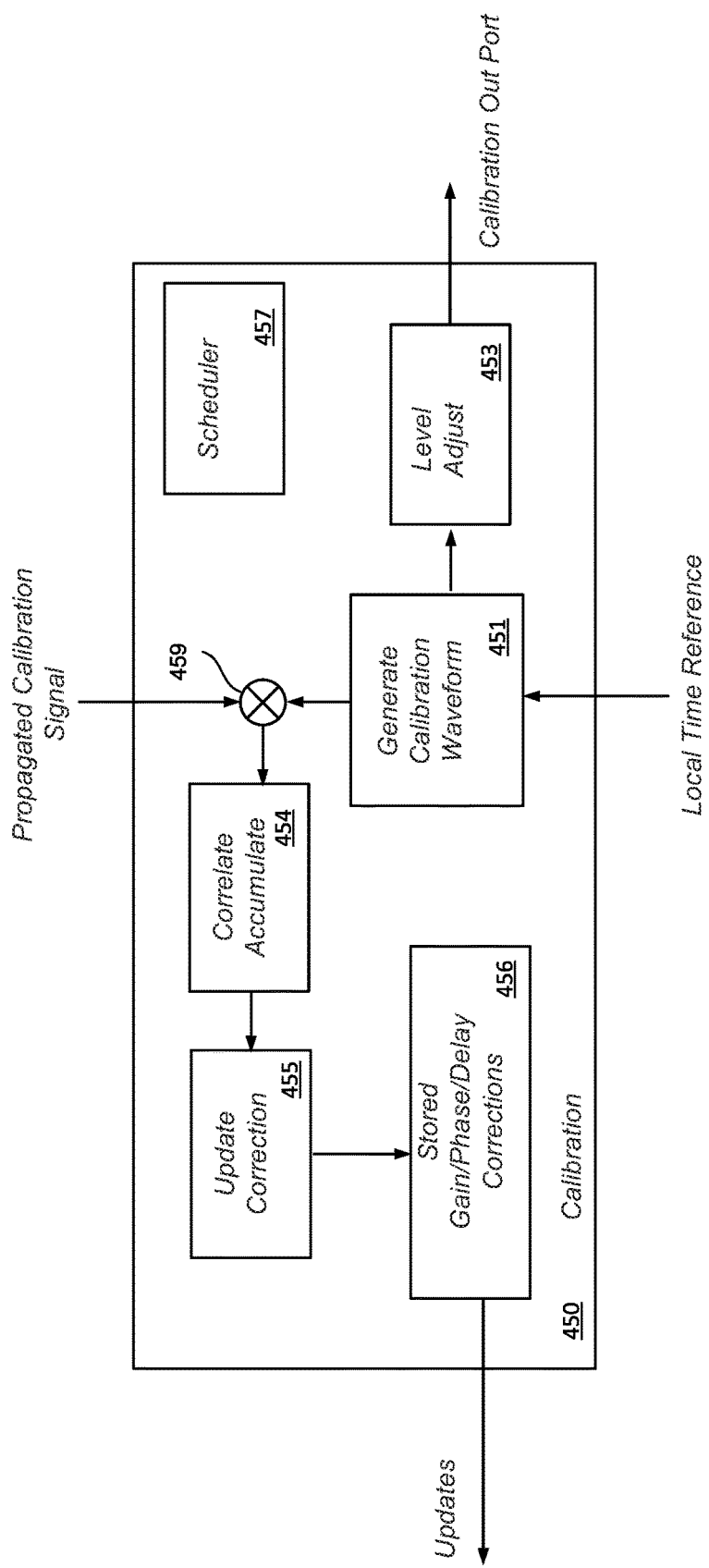
FIG. 4 is a block diagram for one embodiment of a calibration block.

FIG. 4 is a block diagram for one embodiment of a calibration block 450, such as can be used for calibration block 350 in FIG. 3 or calibration block 650 in FIG. 6 below. Block 451 receives a local time reference and from this generates the spread spectrum calibration signal, which then has its power level adjusted at block 453, providing the spread signal, low power calibration signal for injection. For the receive path, this signal is first up-converted, as illustrated in FIG. 3. After propagating through a portion of the circuitry, the calibration signal is then received at the multiplier 459, where it is combined with the original calibration waveform, the result going to the correlation/accumulation block 454. From the correlated, accumulated values, update corrections are then determined at block 455. The correction values can be used to determine gain/phase/delay values based on stored values, such as a look up table, at block 456, which are in turn used to update the calibrations for the sub-channels. The scheduler 457 determines which sub-channel is to be calibrated and when.

Figure 5:
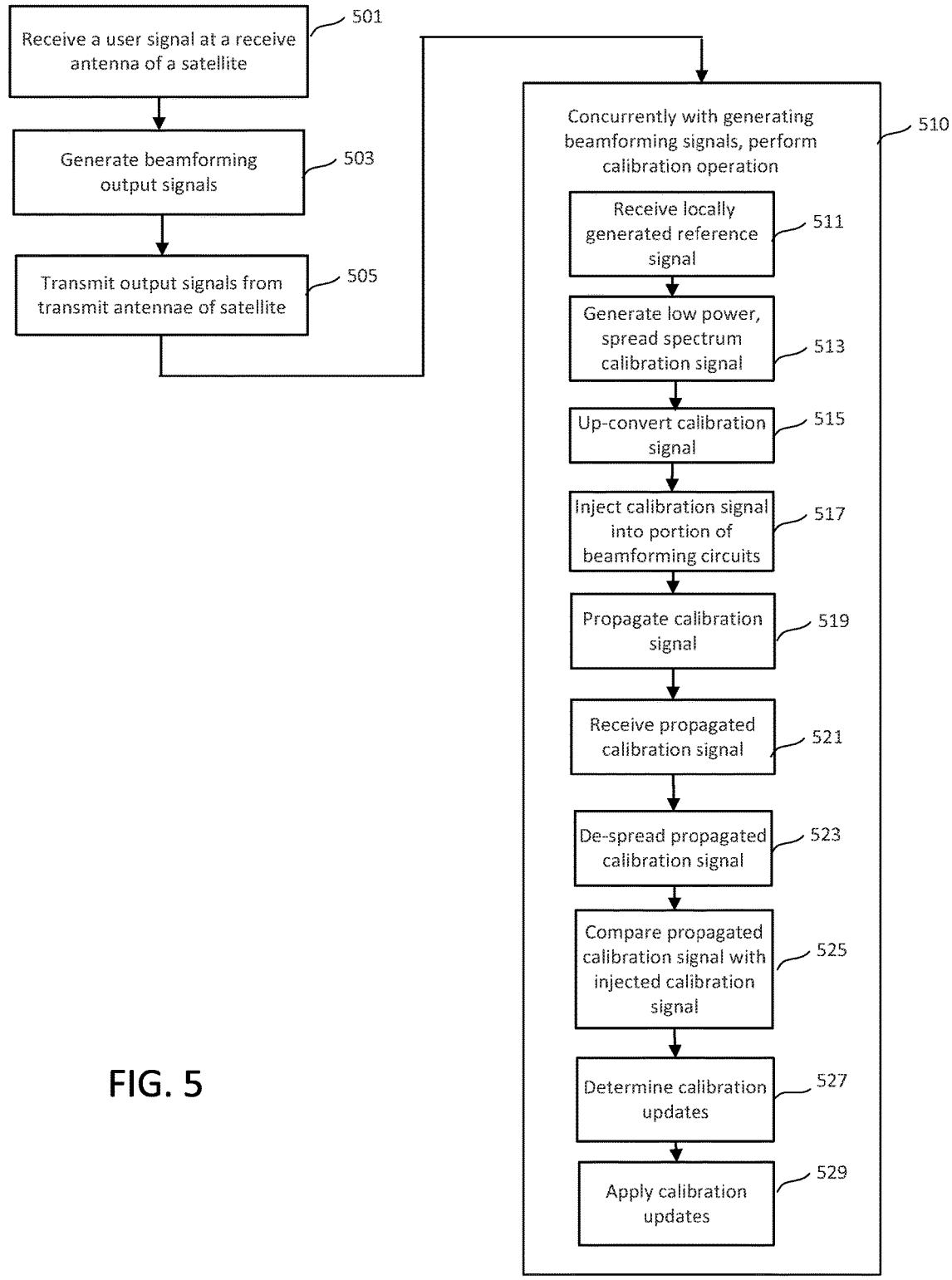
FIG. 5 is a flow chart illustrating one embodiment for a receive side calibration operation using a spread spectrum, low power calibration signal.

FIG. 5 is a flow chart illustrating one embodiment for a receive side calibration operation using a spread spectrum, low power calibration signal as described with respect to FIGS. 3 and 4. The use of the spread spectrum, low power calibration signal allows for a calibration operation to be performed on an active channel, although the calibration operation can also be performed when a channel is otherwise not active, such as part of a test mode. FIG. 5 describes a receive side calibration operation in an active path. At step 501, the satellite receives a user signal at an antenna and, from this received signal, generates one or more corresponding output signals at step 503. In the beamforming example, multiple output signals are formed so that a beam is formed when these are transmitted from corresponding multiple transmit antennae. At step 505, the output signals are transmitted. Step 510 is the calibration process and can be performed concurrently with the generating of the output signals by the beamforming circuitry at step 503.

The flow for the calibration operation of step 510 begins at step 511 with a locally generated reference signal, such as a pseudo-random noise signal generated on the satellite. At step 513 the spread spectrum calibration signal is then generated from the pseudo-random noise sequence and in one embodiment can reside in a 1 MHz sub channel and set to a power level below the thermal noise floor (such as 17 dB below) of the user signals in the channel. At step 515 the calibration signal is up-converted into, for example the 27-30 GHz range and, at step 517, injected into a selected receive path or portion of a receive path. The calibration for different paths and sub-channels can be performed sequentially according to a schedule based on how quickly the calibration of the different channels are found to drift. The injected calibration signal is then propagated through selected sub-channels of the receive side of the beamforming circuitry at step 519. Although the main embodiments presented here calibrate receive side and transmit side separately, alternate embodiments can calibrate the combined receive and transmit paths in a single process or, conversely, further divide up the circuitry in to smaller sections for calibration.

After the injected signal propagate the selected path, it is received back at the calibration block at step 521 and de-spread at step 523. The de-spread signal can then be compared to the original reference signal at step 525 and, based on the comparison the updates needed for the calibration values of the sub-channel can be determined at step 527. Depending on the embodiment, the determination of the update corrections can be performed by processing circuitry on the satellite; determined on the ground based on the results of the comparison sent by the satellite, with the results then returned to the satellite; or a combination of these. It should again be noted that although embodiments shown in the figures here show only two paths, in an actual satellite the number of channels can run into the tens or even hundreds. The update corrections are then applied to the calibration correction elements 343a-d of the sub-paths at step 529.

The calibration of delay, phase and gain values can be made relative to fixed normative values or, as discussed more below with respect to FIG. 13, based on the differential variation in delay, gain, and phase between paths 1 and 2. Except for the RF probe introduced below with respect to FIG. 11, the calibration loop is common mode and will not vary between the times it takes to measure the different paths in the front end. A comparison of the signal through the loop and along each of the front-end paths against a local reference allows the system to estimate the difference between any two paths and hence calibrate it out.

In the calibration process, the phase adjustment to each path can be made after the comparison to the local reference. A timing adjustment can be performed first, after which a residual delay may remain. The phase of each path can be measured relative to the local reference such that paths are coherent at radio frequencies. The local reference can be adjusted to minimize the largest required correction across all paths. The gain adjustment of each path can be to a local nominal value, which can slowly adjust to minimize the largest required correction across all paths.

Looking now at the transmit side calibration, the transmit side calibration is concerned with measuring the variations in delay, gain, and phase in transmit path 1 circuitry 225 and transmit path 2 circuitry 227 of FIG. 2A, as well as in the input hybrid matrix IHM 229 and output hybrid matrix OHM 228. As with the receive side, the rest of the calibration loop is common mode or measured beforehand and accounted for in the calibration. One difference from the receive side is the existence of the hybrid matrices IHM 229 and OHM 228. As these mix signals from multiple paths, these can have their own gain/phase matching problems. As discussed further below with respect to FIG. 8, in some embodiments the transmit side calibration can be done in two steps to account for these elements.

Figure 6:
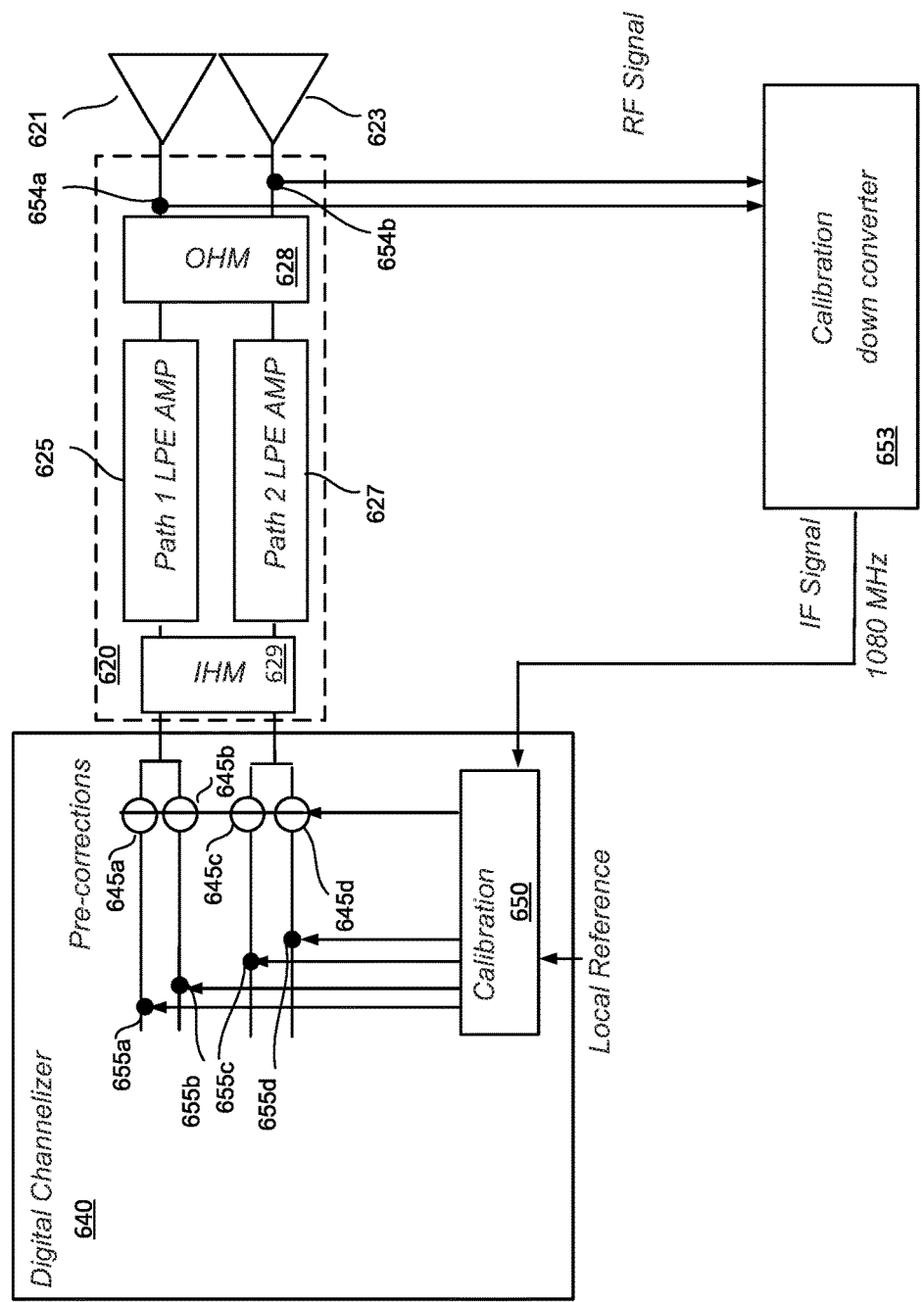
FIG. 6 illustrates an embodiment of the transmit side circuitry incorporating the spread spectrum calibration elements.

FIG. 6 illustrates an embodiment of the transmit side circuitry incorporating the spread spectrum calibration elements, repeating the transmit side elements of FIG. 2 and adding calibration elements. More specifically, the transmit side of the satellite includes two antennae or output ports 621 and 623 each connected to a corresponding transmit path 625, 627 through the output hybrid matrix OHM 628. A set calibration pre-correction elements 645a-d are included at the start of the sub-channel transmit paths. Signals from the sub-channels in the digital channelizer section 640 connected to the transmit paths 625 and 627 by the input hybrid matrix IHM 629.

The calibration block 650 is connected to receive a local reference signal, from which it generates a calibration signal. As with the receive side embodiments described with respect to FIGS. 3-5, in this embodiment, the calibration block 650 generates a calibration signal that is a low power, spread spectrum signal formed from pseudo-random noise. In the embodiment illustrated in FIG. 6, the calibration signal is injected at injection ports 655a-d into selected sub-channels before the pre-correction elements 645a-d and extracted at before the output ports 621 and 623 at the calibration extraction ports 654a and 654b. In other embodiments, the calibration signal can be injected, extracted or both at other points in order calibrate smaller divisions of the transmit circuitry. A calibration down-converter 653 down-converts the extracted RF frequency calibration signal to an intermediate frequency (1080 MHz in this example) and returns it to the calibration block 650, where it can be de-spread and compared with the original signal. Based on the comparison, update corrections can be determined and supplied to the pre-calibration correction elements 645a-d. The determination of the pre-correction updates from the comparisons can performed on the satellite, on the ground, or a mixture of these.

Figure 7:
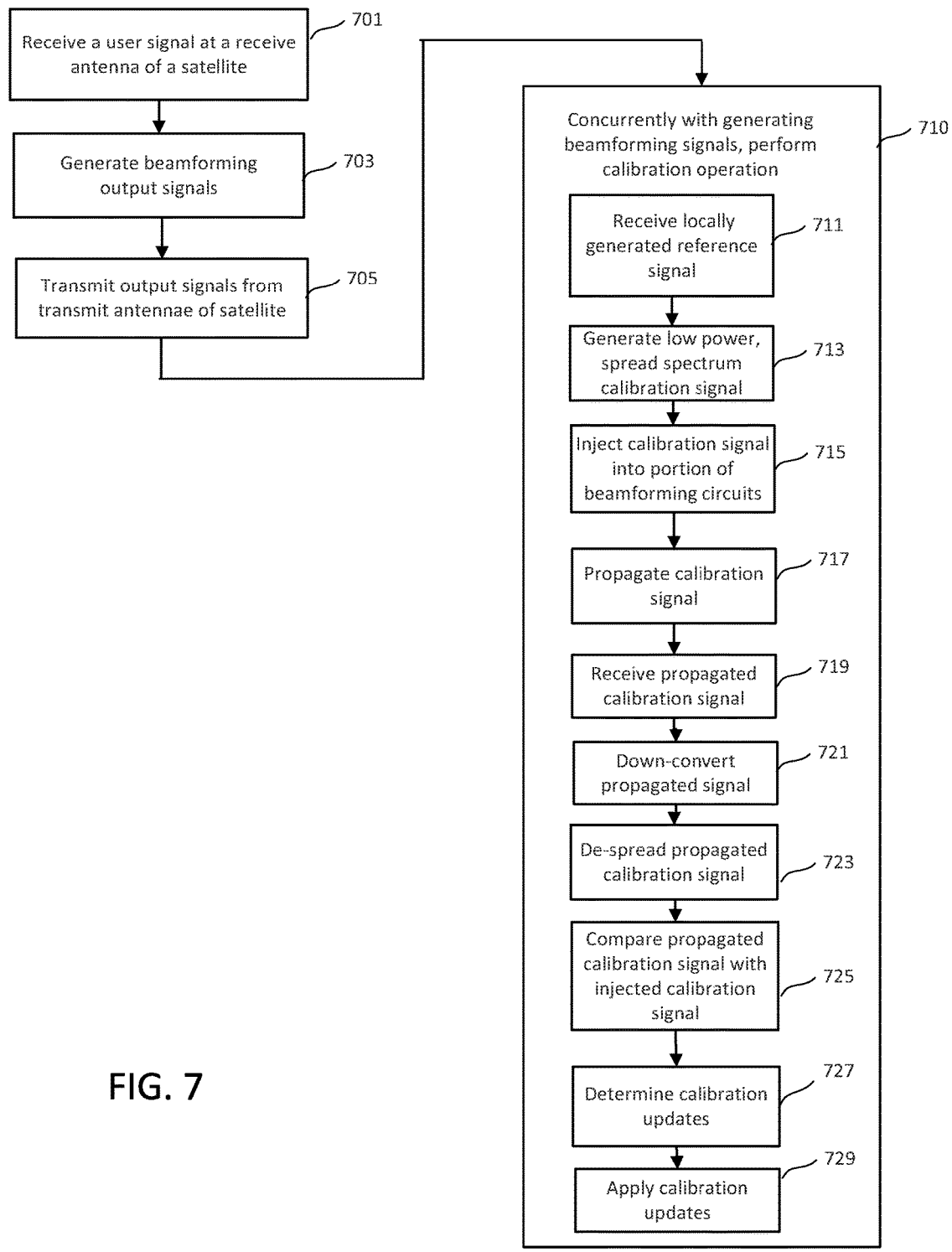
FIG. 7 is a flow chart illustrating one embodiment for a transmit side calibration operation using a spread spectrum, low power calibration signal.

FIG. 7 is a flow chart illustrating one embodiment for a transmit side calibration operation using a spread spectrum, low power calibration signal as described with respect to FIG. 6. The use of the spread spectrum, low power calibration signal allows for a calibration operation to be performed on an active channel, although the calibration operation can also be performed when a channel is otherwise not active, such as part of a test mode. FIG. 7 describes a receive side calibration operation in an active path. At step 701, the satellite receives a user signal at an antenna and, from this received signal, generates one or more corresponding output signals at step 703. In the beamforming example, multiple output signals are formed so that a beam is formed when these are transmitted from corresponding multiple transmit antennae. At step 705, the output signals are transmitted. Step 710 is the calibration process and can be performed concurrently with the generating of the output signals by the beamforming circuitry at step 703.

The flow for the calibration operation of step 710 begins at step 711 with a locally generated reference signal, such as a pseudo-random noise signal generated on the satellite. At step 713 the spread spectrum calibration signal is generated from the pseudo-random noise sequence and in one embodiment can reside in a 1 MHz sub channel and set to a power level below the thermal noise floor (such as 17 dB below) of the user signals in channel. At step 715 the calibration signal is injected into a selected transmit path sub-channel. The calibration for different paths and sub-channels can be performed sequentially according to a schedule based on how quickly the calibration of the different channels are found to drift. The injected calibration signal is then propagated through selected sub-channels of the transmit side of the beamforming circuitry at step 717. Although the main embodiments presented here calibrate receive side and transmit side separately, alternate embodiments can calibrate the combined receive and transmit paths in a single process or, conversely, further divide up the circuitry in to smaller sections for calibration.

After the injected signal propagates through the selected path, it is extracted and down-converted at step 719, received back at the calibration block at step 721 and de-spread at step 723. The de-spread signal can then be compared to the original reference signal at step 725 and, based on the comparison the updates needed for the pre-calibration values of the sub-channel can be determined at step 727. Depending on the embodiment, the determination of the update corrections can be performed by processing circuitry on the satellite; determined on the ground based on the results of the comparison sent by the satellite, with the results then returned to the satellite; or a combination of these. It should again be noted that although embodiments shown in the figures here show only two paths, in an actual satellite the number of channels can run into the tens or even hundreds. The update corrections are then applied to the calibration correction elements 645a-d of the sub-paths at step 729.

In FIG. 6, the calibration signal is injected before the input hybrid matrix IHM 629 and extracted after the output hybrid matrix OHM 628, so that phase, gain and delay errors can be introduced in any of these elements, as well as in any amplifiers or other elements in the transmit paths 625 and 627. Consequently, these transmit side differs from the from the receive side due to the complication of the hybrid matrices IHM 229 and OHM 228.

Figure 8:
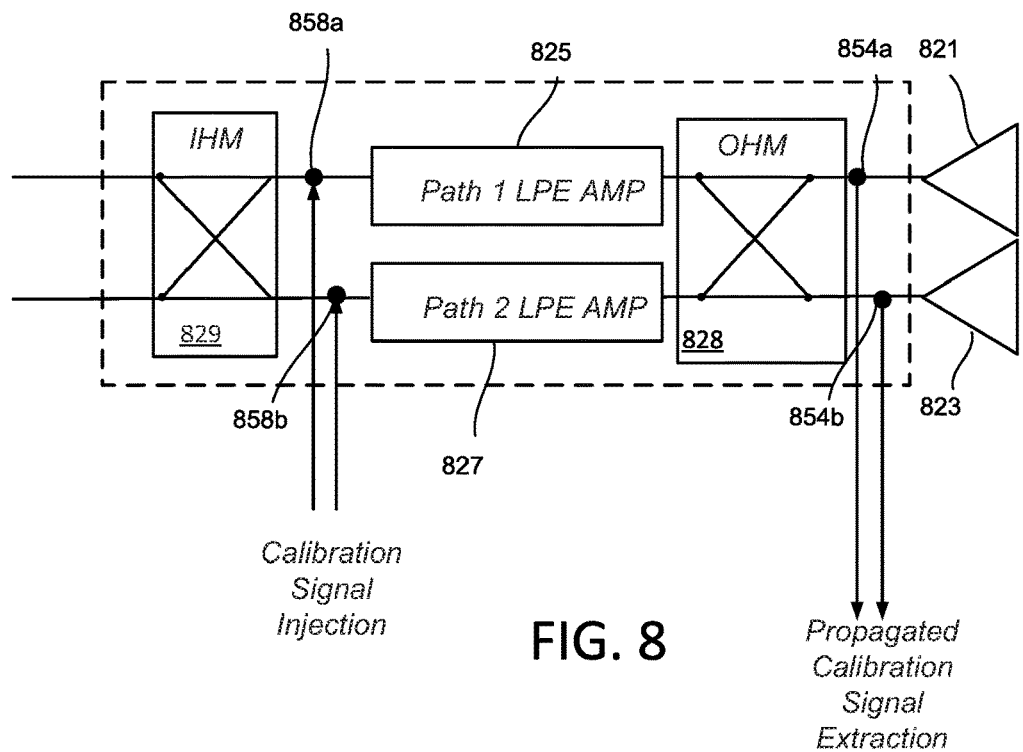
FIG. 8 is a schematic representation of a portion of the transmit section of FIG. 6 to illustrate the mixing of channels.

FIG. 8 is a schematic representation of this portion of the transmit section of FIG. 6 to illustrate the mixing of channels. As shown at left, both channels are input into the input hybrid matrix IHM 829, which allows the signal from either channel to be distributed across both of transmit track path 1 825 and transmit path 2 827, so that the amplifiers in both paths can be used for a given signal. The output hybrid matrix OHM 828 allows the output from either of transmit path 1 825 and transmit path 2 827 to be directed to either of the output ports 821 and 823. As these hybrid matrices mix signals from multiple paths, these elements can have their own gain and phase matching problems. To account for this, in some embodiments the transmit side calibration can be done in multiple steps.

For example, in a first calibration phase, the calibration signal can be injected at the injection ports 858a and 858b, before the output hybrid matrix OHM 828 and the circuitry of the transmit paths 825 and 827, but after the input hybrid matrix IHM 829. If the multiplexing circuitry of the output hybrid matrix OHM 828 is balanced, there will no gain at the calibration extraction ports 854a and 854b. After updating the calibration for these elements, the calibration for the whole of the transmit side can be performed assuming that the output hybrid matrix OHM 828 introduces no error. The process of measuring the calibration parameters for the output hybrid matrix and then correcting for the full path can be iterated if desired to increase the calibration accuracy.

Figure 9:
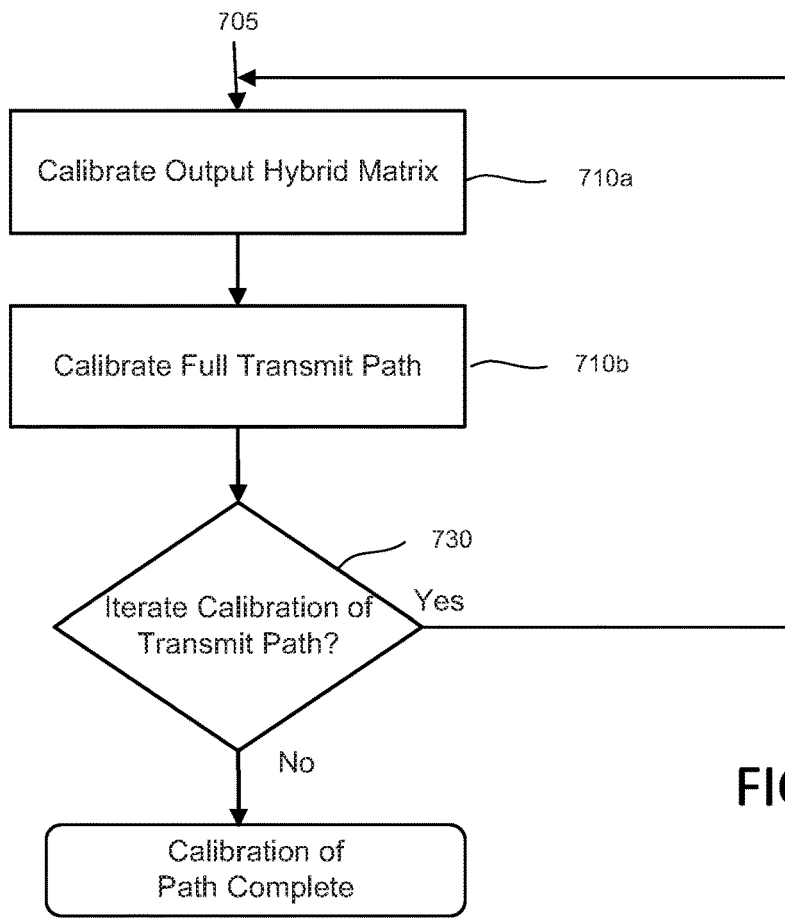
FIG. 9 is a flow chart illustrating one embodiment for incorporating a two-step calibration process into the transmit side flow of FIG. 5.

FIG. 9 is a flow chart illustrating one embodiment for incorporating a two-step calibration process into the transmit side flow of FIG. 7, where an initial calibration is done for a hybrid matrix element followed by a full transmit side calibration. Referring back to FIG. 7, after step 705, the transmit path of FIG. 6 is calibrated at step 710, where the calibration signal is injected before the input hybrid matrix IHM 629 of FIG. 6 and extracted after the output hybrid matrix OHM 628. In FIG. 9, the calibration step 710 is performed twice, a first time at step 710*a* where the calibration signal is injected at a selected one of 858*a* and 858*b*, with steps 711-729 performed for the output hybrid matrix 828 section and the circuitry of the transmit paths 825 and 827. Step 710*b* is then performed a second time, performing steps 711-729 for the whole of the transmit path. If higher accuracy is wanted, the process can be iterated by looping back at step 730 to repeat step 710*a*.

To simplify the discussion, the examples illustrated here have been using only two receive paths and two transmit paths, but an actual satellite may have tens or even hundreds of such paths. Consequently, even if a calibration operation of a signal sub-channel or path does not require an overly large amount of time, measuring the gain, phase and delay for all or most paths and frequencies to the required accuracies for beamforming can be time consuming.

The amount of time required to accurately measure the amount of error in a sub-channel depends on the signal to noise ratio (S/N) for the user signal active in a path. To be able to accurately measure the error in a path for all power levels with a fixed integration or dwell time would require that all measurements assume the highest power level that may be used in a channel. However, by reducing the dwell time for each measurement based on the power level in each path/sub channel, the system can reduce the load on the circuitry and processing by large factors (such as 10-100 based on maximum to minimum user power level in each sub channel).

Each path/sub channel has a power level estimate associated with it, based on the user signal active in it. The lower the power of the signal, the lower the S/N value. The dwell time for measurement for determining the error in a path can be made a function of the power, with less time spend on lower power sub-channels and only the most powerful signals requiring the maximum dwell. As one of the measurements made in the calibration process is gain, this can be used to update the power level estimate associated with the path/sub channel, which in turn can be used to determine a dwell time.

Figure 10:
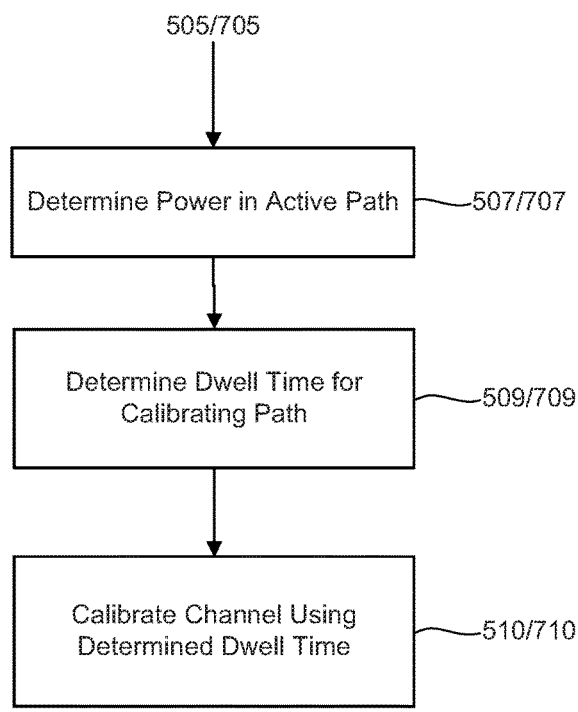
FIG. 10 is a flow chart illustrating one embodiment for basing the calibration dwell time on the power level in a sub-channel.

FIG. 10 is a flow chart illustrating one embodiment for basing the calibration dwell time on the power level in a sub-channel. For a given sub-channel, the dwell time determination can be inserted between steps 505 and 510 for a receive side calibration and between steps 705 and 710. At step 507/707, the power of the user signal active in the sub-channel at step 503/703 is determined. Based on this power level, the dwell time for the calibration is determined at step 509/709, after which the calibration is performed at step 510/710 using this dwell time.

As illustrated in the embodiment of FIG. 3, the calibration signal is injected into the different paths through the calibration injection ports 352*a* and 352*b*. Similarly, in the embodiment of FIG. 6, the calibration signals are extracted at the calibration extraction ports 654*a* and 654*b*. Introducing the switching and taps for the calibration injection ports in the receive paths and calibration extraction ports in the transmit paths of a beamforming satellite to inject and retrieve calibration signals is expensive in complexity and weight of the payload as actual satellites can have large numbers of such paths. Using a transmit probe to inject power into all elements of the receive antenna and a receive probe to collect power from all elements of the transmit antenna can be much simpler and have lower weight.

Figure 11:
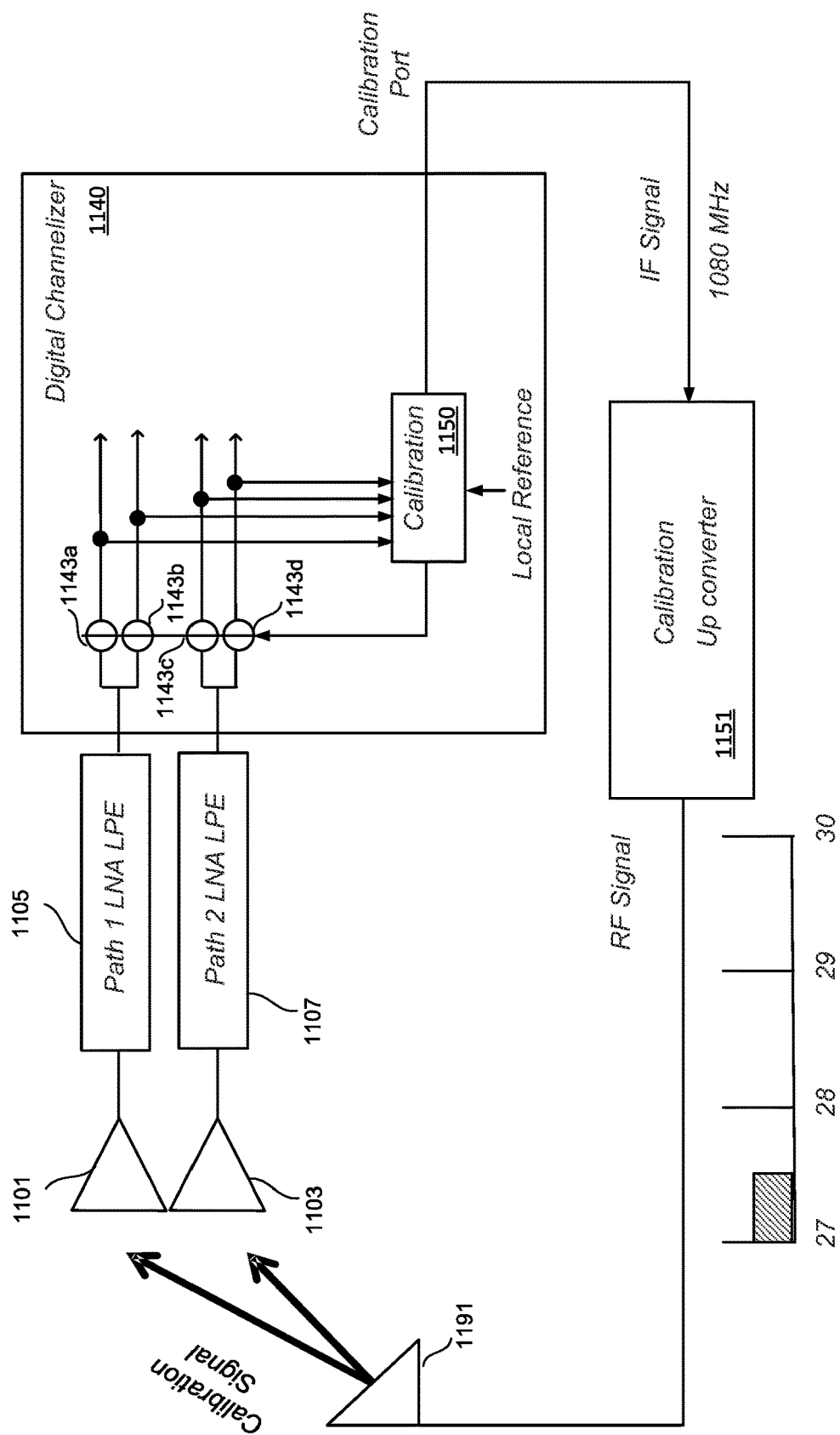
FIG. 11 is an embodiment for receive side calibration elements using a probe to inject the calibration signal.

FIG. 11 is an embodiment for receive side calibration elements using a probe to inject the calibration signal. FIG. 11 repeats many of the elements of FIG. 3, including two antennae or other input ports 1101, 1103 each connected to a corresponding input path 305, 307. A set of calibration correction elements 1143*a-d* are included in the sub-channel receive paths in the digital channelization section 1140. The calibration block 1150 operates as described with respect to FIGS. 3 and 4, including generating the IF calibration signal that is up-converted at block 1151 to the RF range. Rather than inject the up-converted calibration signal into each of the individual paths as in FIG. 3, a probe 1191 is introduced at the receive antenna to emit energy into the receive elements. This removes the need for the switching and tap elements for each of the paths as the calibration signal is now transmitted into all receive paths at the same time. The individual paths can then be selected and calibrated as described above with respect to FIG. 5.

Figure 12:
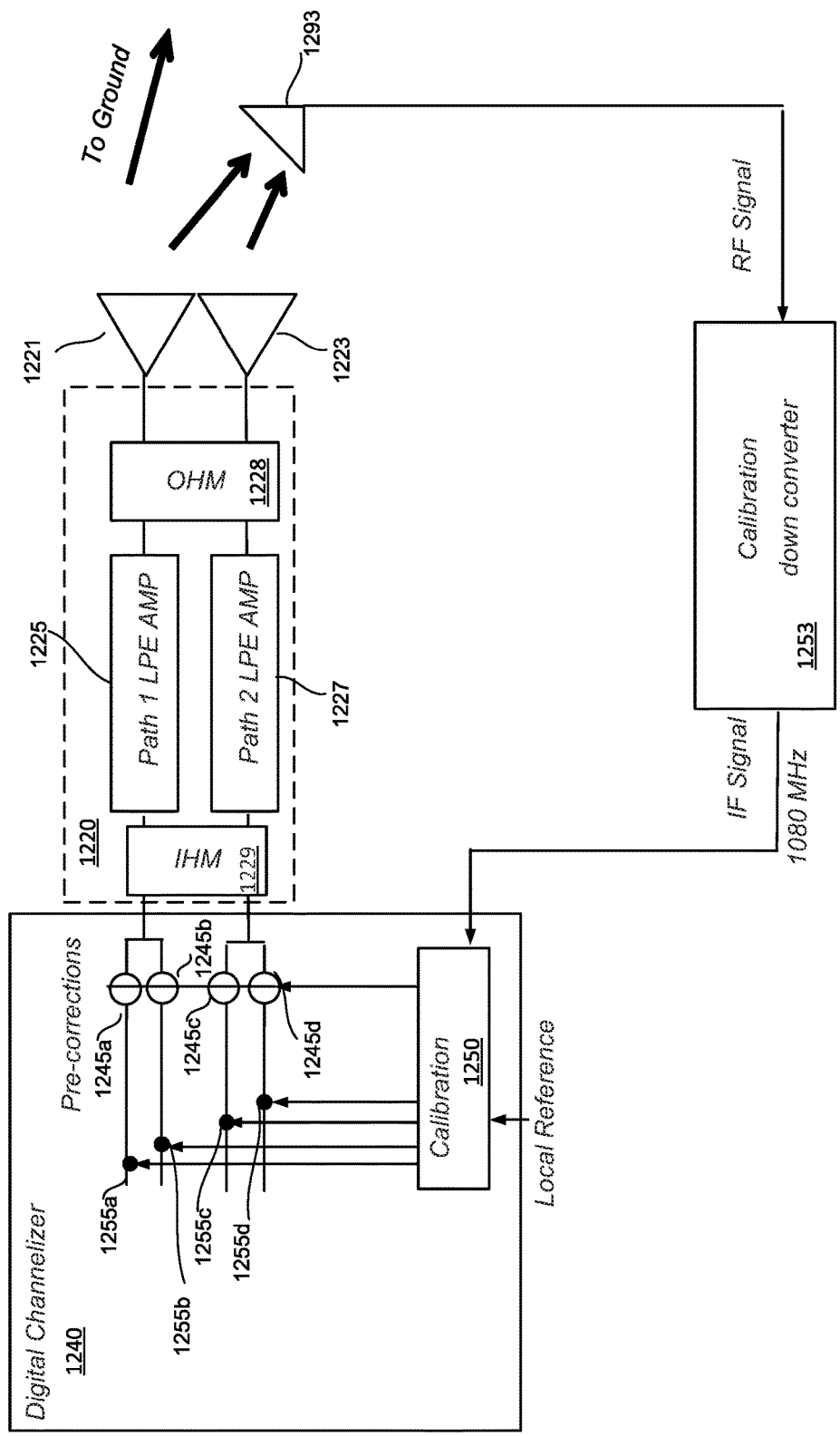
FIG. 12 is an embodiment for transmit side calibration elements using a probe to extract the propagated calibration signal.

FIG. 12 is an embodiment for transmit side calibration elements using a probe to extract the propagated calibration signal. FIG. 12 repeats many of the elements of FIG. 6, including the two antennae or other output ports 1221 and 1223 supplied signals from the output block 1220. Output block 1220 includes transmit path 1 circuitry 1225 and transmit path 2 circuitry 1227, hybrid matrix OHM 1228 and input hybrid matrix IHM 1229. The propagated calibration signal is down-converted at block 1253 and returned to the calibration block 1250, which injects the calibration signal into the sub-channels in the digital channelization section 1240.

Rather than extract the calibration signal from each of the individual paths as in FIG. 6, a probe 1293 is introduced at the transmit antenna to collect energy from the transmit elements. The antenna 1221, 1223 transmit the signals to form each of the beams to the ground, part of which is picked up by the probe 1293. This removes the need for the switching and tap elements to extract the calibration signal individually from each of the paths, as the calibration signal can now be extracted from the signals received from all transmit paths by the same probe 1293. The individual paths can then be calibrated as described above with respect to FIG. 7.

For both the receive probe and transmit probe, the coupling from the probes to the elements can be characterized as part of the initial testing and calibration of the system. As with the previously described embodiments, the calibration signal is recovered by knowing the spreading code and pulling the signal out of the noise. Except for the probe portions, the rest of the calibration loop can be common mode and will not vary between the times it takes to measure the different paths. A comparison of the signal through a loop and along each of the transmit or receive paths is checked against the local reference as described above, allowing the system to estimate the difference between any two paths and calibrate it out. The variation in the probe segments can be calculated and/or measured beforehand and accounted for in the calibration. Most of the variation will typically be in the amplifiers and low power equipment (LPE) for the paths.

When drift rates for phase, gain, and delay are high, sample calibration measurements will have to be performed relatively frequently. Calibrating these parameters by measuring the gain, phase and delay of each path to fixed internal reference values can imposes an unnecessary specification on absolute drift rates. In a beamforming system, it is the relative path-to-path differences in the signals, rather that the absolute values, that are more important since if, for example, a set of beamforming signals are all out of phase, but out of phase by the same amount, they will still form a beam. Calibrating the path-to-path differences in gain, phase and delay of pairs of paths can relax the specification on absolute drift rates. The use of a Kalman filter, for example, allows for path-to-path calibration. FIG. 13 illustrates the situation.

Figure 13:
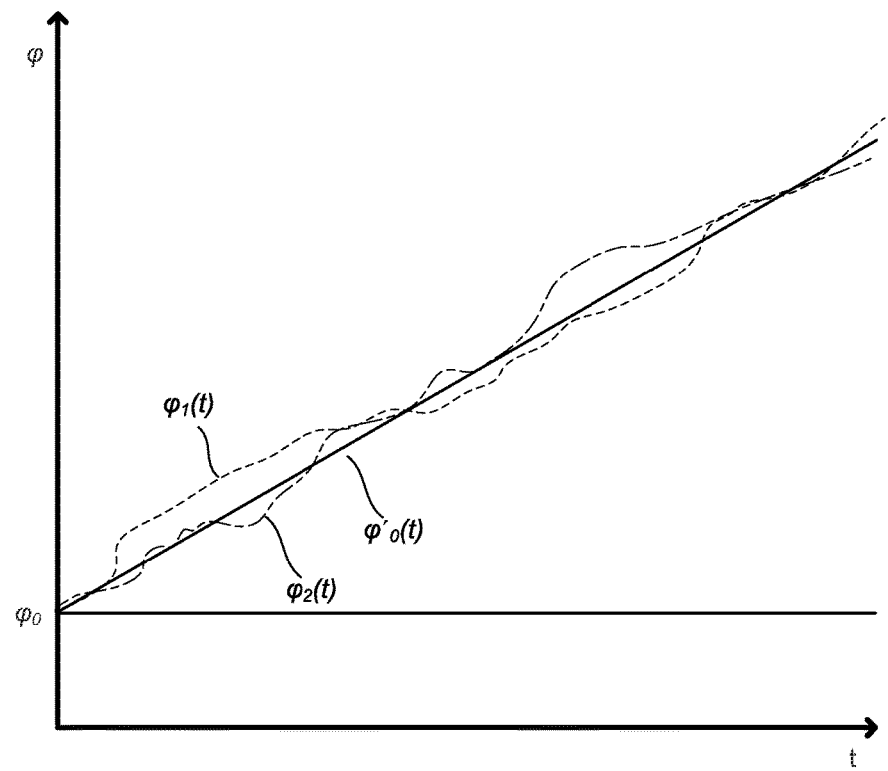
FIG. 13 illustrates the drift in phase of two paths over time.

FIG. 13 illustrates the drift in phase of two paths over time. For example, $\varphi_1(t)$ and $\varphi_2(t)$ could be the phase for paths 1 and 2 for either the receive side of FIG. 3 or the transmit side of FIG. 6. Initially, $\varphi_1(t)$ and $\varphi_2(t)$ are calibrated to an absolute phase $\varphi_0$, but over time drift. If this rate of drift is fast, the phase calibration would need to be performed frequently. However, both of $\varphi_1(t)$ and $\varphi_2(t)$ may be drifting in a similar manner, such as due to, for example, temperature variations that affect both paths similarly. Consequently, although both of $\varphi_1(t)$ and $\varphi_2(t)$ may differ significantly from an absolute phase $\varphi_0$, the path-to-path difference between them may still be close enough to each other to form a beam. The line $\varphi'_0(t)$ is an average amount of drift for $\varphi_1(t)$ and $\varphi_2(t)$ and can instead be used as the basis for determining the calibration and how often to calibrate. In FIG. 13, $\varphi'_0(t)$ is a straight line, but it can also be non-linear when the averaged drift rate varies over time.

The calibrating of path-to-path differences can utilize a Kalman filter, where the internal state is the difference between a calibration parameter and a mean for that parameter. The observables are the individual measurements against an internal reference, where transients of the sample rate are lower than the dynamics of the parameters. The Kalman estimator can smoothly track the internal state and allow correction of the path-to-path variation with tracking of the absolute drift.

In a first set of embodiments, a system includes one or more input ports, a plurality of output ports, and one or more beamforming circuits connected to the one or more input ports and the plurality of output ports. The beamforming circuits are configured to receive signals from the input ports and generate from these a plurality of output signals, the output signals configured to form a beam when transmitted from a corresponding plurality of the output ports. One or more calibration circuits are connected to the beamforming circuits. The calibration circuits are configured to generate a calibration signal and inject the calibration signal into the beamforming circuits concurrently with the beamforming circuits receiving from a first input port a user signal and generating output signals from the user signals. The calibration signal is a spread spectrum signal with a power level lower than a noise floor of the user signal. The calibration circuits are further configured to receive the injected calibration signal after propagation through a portion of the beamforming circuits and, based on a comparison of the injected calibration signal to the calibration signal after propagating through the portion of the beamforming circuit, perform a calibration operation on the beamforming circuits.

In another set of embodiments, satellite has multiple receive antennae and multiple transmit antennae. One or more output signal generating circuits are connected to the receive antennae and the transmit antennae, and are configured to receive signals from the receive antennae and generate from these output signals for the transmit antennae. One or more calibration circuits are connected to the output signal generating circuits, where the calibration circuits are configured to generate a calibration signal and inject the calibration signal into the output signal generating circuits concurrently with the output signal generating circuits receiving from the input antennae a user signal and generating from the user signal output signals. The calibration signal is a spread spectrum signal with a power level lower than a noise floor of the user signal. The one or more calibration circuits are further configured to receive the injected calibration signal after propagating through a portion of the output signal generating circuits and, based on a comparison of the injected calibration signal to the calibration signal after propagating through the portion of the output signal generating circuits, perform a calibration operation on the output signal generating circuits.

Other embodiments present methods including receiving a user signal at a receive antenna of a satellite, transmitting a plurality output signals from a plurality transmit antenna, and generating by one or more beamforming circuits a plurality of output signals from the user signal, the output signals configured to form a beam when transmitted from the plurality transmit antenna. Concurrently with generating the plurality of output signals, performing a calibration operation is also performed on the one or more beamforming circuits. The calibration operation includes: generating a spread spectrum calibration signal having a power level lower than a noise floor of the user signal; injecting the calibration signal into the one or more beamforming circuits; and receiving the injected calibration signal after propagating through a portion of the beamforming circuits. A comparison is performed of the injected calibration signal to the calibration signal after propagating through the portion of the beamforming circuit, and a calibration operation is performed on the beamforming circuits based on the comparison.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A system, comprising:
   one or more input ports;
   a plurality of output ports;
   one or more beamforming circuits connected to the one or more input ports and the plurality of output ports, configured to receive signals from the one or more input ports and generate therefrom a plurality of output signals, the output signals configured to form a beam when transmitted from a corresponding plurality of the output ports; and
   one or more calibration circuits connected to the beamforming circuits, the calibration circuits configured to generate a calibration signal and inject the calibration signal into the beamforming circuits concurrently with the beamforming circuits receiving from a first input port a user signal and generating therefrom output signals, the calibration signal being a spread spectrum signal with a power level lower than a noise floor of the user signal, the one or more calibration circuits further configured to receive the injected calibration signal after propagation through a portion of the beamforming circuits and, based on a comparison of the injected calibration signal to the calibration signal after propagating through the portion of the beamforming circuit, performing a calibration operation on the beamforming circuits.

2. The system of claim 1, wherein the one or more beamforming circuits comprise:
   an input section, connected to one or more input ports and configured to generate therefrom a plurality of sub-channel signals;
   an output section configured to the generate the output signals from the sub-channel signals; and
   a channelizer circuit connected to the input section and the output section and configured to selectively connect the sub-channel signals to the output section.

3. The system of claim 2, wherein the portion of the beamforming circuits is the input section, and wherein the system further comprises:
   an input probe connected to the one or more calibration circuits, the input probe configured to concurrently inject the calibration signal into the one or more input ports.

4. The system of claim 2, wherein the portion of the beamforming circuits is the output section.

5. The system of claim 4, wherein the system further comprises:
   an output probe connected to the one or more calibration circuits, the output probe configured to receive the calibration signal after propagating through the output section of the beamforming circuits from the plurality of output ports.

6. The system of claim 4, wherein the output section includes an input hybrid matrix, an output hybrid matrix, and a plurality of signal paths each including one or more amplifier elements connected between the input hybrid matrix and the output hybrid matrix, the calibration operation including initially performing a calibration for the output hybrid matrix independently of the input hybrid matrix and signal paths and subsequently performing a calibration for the output section including the input hybrid matrix, the signal paths and the output hybrid matrix.

7. The system of claim 1, wherein the calibration signal is propagated through the portion of the beamforming circuits for an amount of time that is a function of a power level of the user signal.

8. The system of claim 1, wherein the calibration operation calibrates different paths between the one or more input ports and the plurality of output ports based on path to path differences.

9. A satellite, comprising:
   a plurality of receive antennae;
   a plurality of transmit antennae;
   one or more output signal generating circuits connected to the receive antennae and the transmit antennae, configured to receive signals from the receive antennae and generate therefrom output signals for the transmit antennae, the output signals configured to form a beam when transmitted from a corresponding plurality of the transmit antennae; and
   one or more calibration circuits connected to the output signal generating circuits, the calibration circuits configured to generate a calibration signal and inject the calibration signal into the output signal generating circuits concurrently with the output signal generating circuits receiving from the input antennae a user signal and generating therefrom output signals, the calibration signal being a spread spectrum signal with a power level lower than a noise floor of the user signal, the one or more calibration circuits further configured to receive the injected calibration signal after propagating through a portion of the output signal generating circuits and, based on a comparison of the injected calibration signal to the calibration signal after propagating through the portion of the output signal generating circuits, performing a calibration operation on the output signal generating circuits,
   wherein the output signal generating circuits are beamforming circuits.

10. The satellite of claim 9, further comprising:
    an input probe connected to the one or more calibration circuits, the input probe configured to concurrently inject the calibration signal into the plurality of receive antennae.

11. The satellite of claim 9, further comprising:
    an output probe connected to the one or more calibration circuits, the output probe configured to receive the calibration signal after propagating through the output signal generating circuits from the plurality of transmit antennae.

12. The satellite of claim 9, wherein the output signal generating circuits include an input hybrid matrix, an output hybrid matrix, and a plurality of signal paths each including one or more amplifier elements connected between the input hybrid matrix and the output hybrid matrix, the calibration operation including initially performing a calibration for the output hybrid matrix independently of the input hybrid matrix and signal paths and subsequently performing a calibration including the input hybrid matrix, the signal paths and the output hybrid matrix.

13. The satellite of claim 9, wherein the calibration signal is propagated through the portion of the output signal generating circuits for an amount of time that is a function of a power level of the user signal.

14. The satellite of claim 9, wherein the calibration operation calibrates different paths between the receive antennae and the transmit antennae based on path to path differences.

15. A method, comprising:
receiving a user signal at a receive antenna of a satellite;
transmitting a plurality output signals from a plurality transmit antenna;
generating by one or more beamforming circuits a plurality of output signals from the user signal, the output signals configured to form a beam when transmitted from the plurality transmit antenna; and
concurrently with generating the plurality of output signals, performing a calibration operation on the one or more beamforming circuits, the calibration operation including:
  generating a spread spectrum calibration signal having a power level lower than a noise floor of the user signal;
  injecting the calibration signal into the one or more beamforming circuits;
  receiving the injected calibration signal after propagating through a portion of the beamforming circuits;
  performing a comparison of the injected calibration signal to the calibration signal after propagating through the portion of the beamforming circuit; and
  performing a calibration operation on the beamforming circuits based on the comparison.

16. The method of claim 15, wherein the receive antenna is one of a plurality of receive antennae and the method further includes:
  concurrently injecting the calibration signal into the plurality of receive antennae by an input probe.

17. The method of claim 15, further comprising:
  receiving the injected calibration signal after propagating through a portion of the beamforming circuits from the plurality of transmit antennae by an output probe.

18. The method of claim 15, wherein the beamforming circuits include an input hybrid matrix, an output hybrid matrix, and a plurality of signal paths each including one or more amplifier elements connected between the input hybrid matrix and the output hybrid matrix, the calibration operation includes:
  performing a calibration for the output hybrid matrix independently of the input hybrid matrix and signal paths; and
  subsequently performing a calibration including both the input hybrid matrix, the signal paths and the output hybrid matrix.

19. The method of claim 15, wherein the calibration signal is propagated through the portion of the beamforming circuits for an amount of time that is a function of a power level of the user signal.

20. The method of claim 15, wherein the calibration operation calibrates different paths between the receive antenna and the plurality of transmit antennae based on path to path differences.

* * * * *